United States Patent Office 3,282,865
Patented Nov. 1, 1966

3,282,865
COMPOSITION OF HEXAMETHOXYMETHYL-
MELAMINE WITH VISCOUS PLASTICIZERS
Frank Russell Spencer, Stamford, Conn., assignor to Formica Corporation, Cincinnati, Ohio, a corporation of Delaware
No Drawing. Filed Sept. 27, 1963, Ser. No. 311,979
12 Claims. (Cl. 260—2.5)

This invention relates to triazine elastomeric blends capable of expanding to foams which set under acidic conditions, with or without heat, to hard rigid structures. Further, this invention relates to methods of making hard, rigid cellular articles and to the cellular articles of manufacture so prepared.

Good quality expandable resinous compositions have long been found of value as foamed articles, for example in thermal insulation, packaging or for the manufacture of novelties. Moreover, foamable compositions are of value in the preparation of adhesives, sealants, or caulking compounds particularly where such compositions have the advantage of setting under the influence of acid catalysts, or heat in combination with acid catalysts, to form rigid, tough cellular structures.

Furthermore, when such expandable compositions are based upon ingredients which have properties such as water and hydrocarbon solvent resistance, low burning rate, latent hardening capability and initial moderate viscosity, it is evident that such compositions, if they have the additional advantages of convenience and economy in preparation and handling, lend themselves to a wide range of useful applications.

It is an object of this invention to provide elastomeric blends which are capable of expanding to cellular structures which will harden under the influence of acidic compounds, with or without the application of heat, to form tough, rigid structures.

A further object of this invention is to provide hard, rigid cellular structures which are also solvent resistant and have low rates of burning.

Another object of this invention is the development of a process for preparing such expandable blends and the foamed articles of manufacture prepared therefrom.

According to the present invention, these and other objects are accomplished by a blend of from about 99% to 70% by weight of hexamethoxymethylmelamine, from about 1% to 30% by weight of polyvinylbutyral, from about 2% to 25% by weight, based on the combined total weight of the hexamethoxymethylmelamine and the polyvinyylbutyral, of a nitrogenous blowing agent, and minor amounts of an acid catalyst.

The triazine derivative employed in the blend is the hexamethyl ether of hexamethylolmelamine. Hexamethylolmelamine is prepared by procedures well known in the art and are generally based upon the reaction of melamine with aqueous formaldehyde, using an excess of formaldehyde over the theoretical ratio required for complete methylolation of the melamine. Generally, mol ratios ranging from about 6.5 to about 20 mols or more of formaldehyde per mol of melamine are employed to form the hexamethylolmelamine. Thereafter, the hexamethylol compound is converted to the hexamethyl ether derivative by reaction with excess methyl alcohol in the presence of acid, employing from about 10 to about 20 mols of methanol per mol of melamine starting material. The resulting composition comprises a mixture of products predominating in hexamethoxymethylmelamine and the reaction product contains, in combination, from about 1:5.5:5.5 to 1:6:6 mols on the average of melamine, formaldehyde, and methanol, respectively. Various modifications and improvements on the basic methods of preparing these melamine ethers have been developed, such as those set forth in U.S. Patent Nos. 2,998,410 and 2,998,411 which are incorporated herein by reference.

The polyvinylbutyral ingredient is a commercially available thermoplastic material normally derived by reaction of a vinyl alcohol resin with butyraldehyde and may contain minor amounts of other reactants or side products such as polyvinyl acetate and polyvinyl alcohol. Typical materials comprise up to about 30%, preferably 0% to 3%, by weight acetate groups expressed as polyvinyl acetate, up to about 30%, preferably 5% to 25%, by weight hydroxyl groups, expressed as polyvinyl alcohol, and the balance being butyral groups, preferably from about 70% to 90% by weight, expressed as polyvinyl butyral. Molecular weights (weight average molecular weight) range from about 25,000 to 300,000. Polyvinyl butyral is available commercially from Union Carbide Corporation ("Bakelite" XYHL, XYSG) and Shawinigan Resins Corporation ("Butvar"). Also illustrative of these well known polymers are the polyvinyl butyral ingredients described in U.S. Patent Nos. 2,345,946; 2,358,355; 2,422,754 and 2,455,402.

The nitrogeneous blowing agents are any of those compounds well known in the art which release nitrogen when used in combination with expandable blends, preferably when such blends contain acidic compounds.

Among the classes of commercially available nitrogenous compounds suitable for this purpose, are azo-compounds such as azodicarbonamide, azobisisobutyronitrile, diazoaminobenzene; N-nitroso compounds such as N,N'-dimethyl-N,N'-dinitrosoterephthalamide, N,N'-dinitrosopentamethylenetetramine; sulfonyl hydrazides such as benzene-1,3-disulfonyl hydrazide, diphenylsulfon-3,3'-disulfonyl hydrazide, 4,4'-oxybis(benzenesulfonyl hydrazide) and the like, as described in "Modern Plastics Encyclopedia" 38, No. 1A, 363–372 (1960). Other classes of compounds useful for the same purpose are triazenes, hydrazine derivatives, nitrites of organic bases, diazonium salts and pentazdienes.

The acidic compounds employed to hasten the cure of the expandable or expanded composition are any of the conventional acidic compounds recognized in the art as polymerization catalysts for effecting cross-linkage of the hexamethoxymethylmelamine. Among such acid catalysts are para-toluene sulfonic acid, formic, acetic, propionic, maleic, tartaric, trichloroacetic, and the mineral acids such as phosphoric, hydrochloric, hydrobromic, sulfuric, nitric, acid salts, esters, and the like. The proportion of acid catalyst is not critical and may range from as little as 0.01% for the strong mineral acids up to about 5% or more for the weaker acids. The preferred range is from about 0.25% to 2.5% by weight based on the combined weight of polyvinylbutyral and hexamethoxymethylmelamine.

Optionally, at any stage prior to complete expansion of the composition, for example, after the polyvinylbutyral is blended with the hexamethoxymethylmelamine, particulate or fibrous fillers, such as α-cellulose, asbestos, and the like, conventional fire-retarding additives, for example, phosphates such as aryl and halogenated phosphates, pigments, dyes, plasticizers and stabilizers may be added.

Solutions of hexamethoxymethylmelamine and common solvents, e.g., 5% ethyl alcohol in water, may also be employed but solvent-free systems are preferred since solvents render the compositions somewhat unstable, less convenient to handle, and the foamed articles have less strength.

The method of preparing the expandable blends of the present invention and the hard, rigid cellular articles resulting therefrom, may be described as follows. The hexamethoxymethylmelamine and polyvinylbutyral are blended in a suitable vessel while stirring and heating at about 90° C. to about 130° C. At higher temperatures the uncatalyzed blend is unstable and will rapidly gel. Depending upon the qualities desired in the final foamed product, the proportions of hexamethoxymethylmelamine to polyvinylbutyral may be varied from about 99% to 70% and correspondingly from about 1% to 30% by weight, respectively. As little as 1% polyvinylbutyral will produce a viscous liquid upon admixture with the hexamethoxymethylmelamine. The higher proportions of polyvinylbutyral, for example 20% by weight, although contributing to a stiffer rubbery blend, do not prevent working on rubber rolls at room temperature.

At this point the acid catalyst may be added in amounts of from about 0.01% to 5% by weight, preferably 0.25% to 2.5% based on the combined total weight of hexamethoxymethylmelamine and polyvinylbutyral. However, the acid catalyst may be added before the blend is worked on the rubber rolls or at any time prior to use of the composition as an expandable blend. When the acid catalyst is added to the blend of hexamethoxymethylmelamine and polyvinylbutyral, the composition will immediately begin to vulcanize or gel to a rubbery consistency. At this point, it is desirable to insure uniformity of the blend by transferring the composition to rubber rolls, preferably at about 20° C. to 30° C. or room temperature, and working to achieve uniform admixture.

Lastly, the nitrogenous blowing agent is added in amounts which may vary from about 2% to 25% by weight based on the total combined weight of hexamethoxymethylmelamine and polyvinylbutyral. The resultant blend, with or without heating above room temperature, will spontaneously expand to a cellular structure. Said expansion in the absence of applied heat is gradual and occurs over several days. On the completion of expansion, the composition will slowly set to a hard, rigid mass. However, the rate and extent of expansion and hardening may be controlled by varying the proportions of acid catalyst and nitrogenous blowing agent as well as by altering the temperature and heating time. With respect to the latter conditions, it has been found, for example, that temperature-time cycles may be varied by as much as 60° F. for one month to 325° F. for 5 minutes to obtain products having varying degrees of cell size and texture.

The simple admixture of hexamethoxymethylmelamine, polyvinylbutyral itself is a useful composition since its rubbery nature gives it the advantage of an adhesive quality for virtually any surface but without the disadvantages of natural gum rubber. Thus, it has been observed that the simple admixtures without the nitrogenous blowing agent and acid catalyst are solvent resistant and in fact are insoluble in the common gum rubber solvents. More important still, both the simple admixtures just described and the expandable compositions or foamed articles prepared therefrom, retain the advantageous properties of the hexamethoxymethylmelamine such as low burning rate, solvent resistance and latent reactivity.

Although polyvinylbutyral is known in the prior art as a plasticizing agent for conventional melamine formaldehyde resins as in U.S. Patent No. 2,546,841 and is known to be compatible with solutions of hexamethoxymethylmelamine, nowhere in the prior art is described the superior and unexpected properties of cellular articles prepared by treating dry blends of hexamethoxymethylmelamine and minor amounts of polyvinylbutyral with nitrogenous blowing agents in the presence of acid catalysts. Thus, it is anticipated that the present expandable composition will find particularly valuable use as a caulking composition. The expandable composition may be forced in place between panel joints where it expands and becomes rigid and hard at a rate dependent upon control of heat and the proportion of acid catalyst present. By so filling the gaps and interstices of said panel joints followed by hardening there is provided greatly increased tensile strength and a positive, watertight bond. The weather-exposed joints of structural members of building wall panels and parts inserted loosely into a cavity such as supporting braces for a fence or aircraft member requiring minimum metallic fastening and maximum strength are important potential applications.

Besides the foregoing structural applications, the composition either when pre-expanded or expanded at the location of use will provide cushioning, acoustical and thermal insulation, and will lessen vibration. When employed as a pre-expanded foam, the composition may be backed with an adhesive to assist in applying the material to vertical or overhead joints. But whether used as an expandable caulking composition or in the expanded form as sheets, blocks or as molded articles, the composition may be admixed with other ingredients such as fillers, dyes, plasticizers, stabilizers and the like.

Another prior art composition, that of U.S. Patent No. 2,697,086 employs polyvinylbutyral in a melamine resin system but differs significantly from the present invention. That patent discloses resinous compositions suitable for the preparation of laminate surfaces having improved water, organic solvent and alkali resistance, prepared by coreacting melamine, formaldehyde and certain polyvinylbutyrals under alkaline conditions in an aqueous alcohol medium to obtain a syrup which may subsequently be coated, dried and pressed onto suitable laminate core materials. However, the melamine and formaldehyde are used in a mol ratio of about 1:1.5 to 1:4.5 and hence from products outside the scope of the present invention. The instant invention is further differentiated from the patent in that preferably the present blend is used without liquid solvents. A further difference resides in the initial elastomeric nature of the present blend, which blend will harden to a thermoset state under the conditions set forth herein, due to the latent functionality of the hexamethoxymethylmelamine.

The following examples are given primarily as illustrations of this invention and are not to be construed in any manner as limitations thereon except as indicated in the appended claims. All proportions are by weight unless otherwise indicated.

The commercially available polyvinylbutyral employed in the following examples had the following average percentage compositions and intrinsic viscosities:

|  | PVB-1 | PVB-2 |
| --- | --- | --- |
| Vinyl alcohol resin, percent | 19 | 19 |
| Vinyl acetate resin, percent | 0.3 | 0.3 |
| Vinyl butyral resin, percent | 80.7 | 80.7 |
| Intrinsic viscosity | 0.81 | 1.16 |

*Example I*

Hexamethoxymethylmelamine and PVB-1, 80:20 parts by weight, respectively, were charged into a suitable vessel, heated to about 100° C. with slow stirring for about 10 minutes to give, while hot, a soft, sticky, rubbery elastomer. Upon addition of 1% of paratoluene sulfonic acid (as a 25% solution in methanol) the blend gelled to a highly viscous, rubbery state. The product was then cooled to room temperature and transferred to rubber rolls and worked to insure uniformity. Finally, 10% N,N'-dimethyl-N,N'-dinitroso terephthalamide blowing agent was blended in. The blend was found to adhere excellently to aluminum, steel, cellulosic fibers, etc.

*Example II*

The blend prepared in Example I was foamed by gradual heating. Expansion started at about 125° F. to 150° F. after 4.5 minutes and was complete at 250° F. after 10 minutes. In other foaming tests with the same composition, expansion occurred at a temperature as low as 72° F. and as high as 325° F. However, finer foams resulted from expansion at 200° F. than at higher temperatures.

*Examples III–XI*

The performance of various blowing agents were studied and the results are given in Table I below. The hexamethoxymethylmelamine-polyvinylbutyral blends employed were those of Example I. Ten percent of blowing agent was used, based on the weight of the blend without catalyst.

in the blowing agent and acid. The composition was worked on the rubber mill for 2 to 5 minutes and was then sheeted off.

|  | Parts |
|---|---|
| PVB-1 | 20 |
| HMMM[1] | 80 |
| ptsa[2] | 1 |
| DMDNT[3] | 10 |

[1] Hexamethoxymethylmelamine.
[2] Paratoluene sulfonic acid.
[3] N,N'-dimethyl-N,N'-dinitroso terephthalamide.

This sheet material foamed up on heating. The foam

TABLE I.—VARIOUS EXPANDING AGENTS

| Ex. | Blowing agent at 10% by weight | Trademark or Tradename | Temperature of Blowing 15 min. at ea. temp. gradual heating | | | | Foam Density (p.c.f.) | Foam Texture | Foam Flammability | Cell Type: (1) closed (2) open |
|---|---|---|---|---|---|---|---|---|---|---|
| | | | 150° F. | 200° F. | 250° F. | 300° F. | | | | |
| III | N,N'-dimethyl-N,N'-dinitroso terephthalamide. | Nitrosan | Yes | | | | 31 | Good | Burns | (2). |
| IV | Dinitroso pentamethylene tetramine. | Opex 40 | Yes | | | | 13 | do | SE[1] | (2). |
| V | do | Unicel ND | No | Yes | | | 14 | Fair | Burns | |
| VI | do | Vulcacel | Yes | | | | 17 | Good | do | (2). |
| VII | 4,4'-oxybis (benzene sulfonyl hydrazide). | Celogen | Yes | | | | 14 | Exc | do | (1). |
| VIII | Azodicarbonamide | Celogen AZ | No | No | No | Yes | 35 | Poor | (²) | |
| IX | CCl₂F-CClF₂ | Freon 113 | No | No | | | 17 | Fair | (²) | (2). |
| X | Hexane | | No | No | No | Yes | 33 | Good | (²) | (2). |
| XI | Methanol | | No | Yes | | | 17 | do | (²) | (2). |

[1] SE = self extinguishing.   [2] Decrepitates with violent popping.

*Example XII*

Since the effect of many blowing agents on foam quality is altered by the presence of acid catalysts, the effect of varying the acid catalyst concentration was studied with respect to constant concentration of one of the blowing agents.

TABLE II.—EFFECT OF ACID CATALYST ON ON FOAMING

| Composition | Parts by weight |
|---|---|
| Hexamethoxymethylmelamine | 80 |
| PVB-1 | 20 |
| 4,4-oxybis(benzene sulfonyl hydrazide) | 5 |

| Para toluene sulfonic acid, percent based on above blend | Foam density [1] | Consistency |
|---|---|---|
| 0 | | Gelatinous. |
| .005 | | Do. |
| .05 | | Do. |
| .25 | 17 | Rubbery.[2] |
| .5 | 10 | Do.[2] |
| 1.2 | 11 | Do.[2] |
| 2.5 | 6 | Do.[2] |

[1] Pounds per cubic foot.
[2] After several months, at 25° C. hardened to a rigid mass.

It will be seen that between 0.05% and 0.25% acid catalyst was sufficient to obtain rapid foaming, and that improved densities and textures were obtained with 0.25% or more of catalyst. It was also observed that the combinations which foamed on heating also expanded slowly at room temperature and after a week or more, depending on concentration and type of acid catalyst employed, were fully expanded and beginning to harden.

*Example XIII*

The following blend was prepared by sheeting out polyvinylbutyral PVB-1 on a two roll rubber mill at 130° C. and working in the hexamethoxymethylmelamine over 15 minutes, followed by cooling to 25° C. and blending was self extinguishing when tested according to ASTM method D1692-59T.

*Example XIV*

The following composition was prepared by admixing hexamethoxymethylmelamine and PVB-1 to a paste, and heating to reflux temperature while stirring for 15 minutes. The blend was then cooled and acid and blowing agent added. The mixture was thereafter worked on a two roll mill at 23° C. for about 10 minutes to homogeneity. Gradual expansion and then hardening were observed at room temperature.

|  | Parts |
|---|---|
| PVB-1 | 20 |
| HMMM | 80 |
| ptsa | 1 |
| DNPMT[1] | 11 |

[1] Dinitroso pentamethylene tetramine.

*Example XV*

Same as Example XIV except that "Vulcacel" (a form of Dinitroso pentamethylene tetramine—"Opex"-40) was substituted for the "Opex"-40. The foam produced was similar except that it had lost its self-extinguishing property.

*Example XVI*

Same as Example XIV except that the mixture of PVB-1 and hexamethoxymethylmelamine was heated to 100–110° C. and held for one hour, and 4,4'-oxybis(benzene sulfonyl hydrazide) was substituted for the "Opex"-40. The foam produced was similar to that of Example XV except that the texture was considerably finer and more uniform.

I claim:

1. A composition capable of expanding to a hard, rigid foam comprising a blend of
   (a) from about 99% to 70% by weight of hexamethoxymethylmelamine,
   (b) from about 1% to 30% by weight of polyvinylbutyral,
   (c) from about 2% to 25% by weight of a nitrogenous blowing agent, and
   (d) from about 0.01% to 5.0% by weight of an acid catalyst, the weight of each ingredient being based on the total weight of (a) and (b).

2. A composition capable of expanding to a hard, rigid foam comprising a blend of
   (a) from about 90% to 80% by weight of hexamethoxymethylmelamine,
   (b) from about 10% to 20% by weight of polyvinylbutyral,
   (c) from about 5% to 15% by weight of a nitrogenous blowing agent, and
   (d) from about 0.25% to 2.5% by weight of an acid catalyst, said amounts being based on the total weight of (a) and (b).

3. A process for preparing a hard, rigid cellular article comprising the steps of
   (I) Heating with stirring at from about 90° C. to 130° C., a blend of
      (a) from about 99% to 70% by weight of hexamethoxy methylmelamine,
      (b) from about 1% to 30% by weight of polyvinylbutyral,
   (II) Adding from about 0.01% to 5% by weight, based on the total weight of (a) and (b), of (c) an acid catalyst, to form a rubbery gel,
   (III) Working said gel on rubber rolls at a temperature and for a time sufficient to make said gel uniform,
   (IV) Adding to said gel from about 2% to 25% by weight, based on the total weight of (a) and (b), of (d) a nitrogenous blowing agent, and
   (V) Heating at a temperature and for a time sufficient to cause foaming.

4. The process of claim 3 wherein (a), (b), (c) and (d) are present in amounts of from about 90% to 80%, 10% to 20%, 0.25% to 2.5% and 5% to 15% by weight, respectively, based upon the total weight of (a) and (b).

5. A process for preparing a hard, rigid cellular article comprising the steps of
   (I) Heating with stirring at from about 90° C. to 130° C., a blend of
      (a) from about 99% to 70% by weight of hexamethoxymethylmelamine,
      (b) from about 1% to 30% by weight of polyvinylbutyral,
   (II) Working said blend on rubber rolls at a temperature and for a time sufficient to make said blend uniform,
   (III) Adding to said blend from about 0.01% to 5% by weight of (c) an acid polymerization catalyst, and from about 2% to 25% by weight of (d) a nitrogenous blowing agent, the amounts of (c) and (d) being based on the total weight of (a) and (b), to form a rubbery gel, and
   (IV) Heating at a temperature and for a time sufficient to cause foaming.

6. The process of claim 5 wherein (a), (b), (c) and (d) are present in amounts of from about 90% to 80%, 10% to 20%, 0.25% to 2.5% and 5% to 15% by weight respectively, based upon the total weight of (a) and (b).

7. The cellular article made according to the process of claim 3.

8. The cellular article made according to the process of claim 4.

9. The cellular article made according to the process of claim 5.

10. The cellular article made according to the process of claim 6.

11. A composition capable of expanding to a hard, rigid foam comprising a blend of
    (a) from about 99% to 70% by weight of hexamethoxymethylmelamine,
    (b) from about 1% to 30% by weight of polyvinylbutyral, and
    (c) from about 2% to 25% by weight of a nitrogenous blowing agent, the weight of each ingredient being based on the total weight of (a) and (b).

12. A composition capable of expanding to a hard, rigid foam comprising a blend of
    (a) from about 90% to 80% by weight of hexamethoxymethylmelamine,
    (b) from about 10% to 20% by weight of polyvinylbutyral, and
    (c) from about 5% to 15% by weight of a nitrogenous blowing agent, said amounts being based on the total weight of (a) and (b).

References Cited by the Examiner

UNITED STATES PATENTS

| | | | |
|---|---|---|---|
| 2,546,841 | 3/1951 | Wohnsiedler | 260—856 |
| 2,697,086 | 12/1954 | Lindenfelser et al. | 260—856 |
| 3,093,600 | 6/1963 | Spencer et al. | 260—2.5 |
| 3,160,596 | 12/1964 | Spencer | 260—2.5 |
| 3,211,676 | 10/1965 | Spencer | 260—67.6 |
| 3,211,806 | 10/1965 | Petropoulous | 260—67.6 |

MURRAY TILLMAN, *Primary Examiner.*

N. F. OBLON, *Assistant Examiner.*

UNITED STATES PATENT OFFICE
CERTIFICATE OF CORRECTION

Patent No. 3,282,865                  November 1, 1966

Frank Russell Spencer

It is hereby certified that error appears in the above numbered patent requiring correction and that the said Letters Patent should read as corrected below.

Column 5, line 39, strike out "ON"; same column 5, TABLE II, first column, line 3 thereof, for "4,4-oxybis-(benzene sulfonyl hydrazide)" read -- 4,4′-oxybis-(benzene sulfonyl hydrazide) --.

Signed and sealed this 5th day of September 1967.

(SEAL)
Attest:

ERNEST W. SWIDER                EDWARD J. BRENNER
Attesting Officer                 Commissioner of Patents